United States Patent Office 3,438,183
Patented Apr. 15, 1969

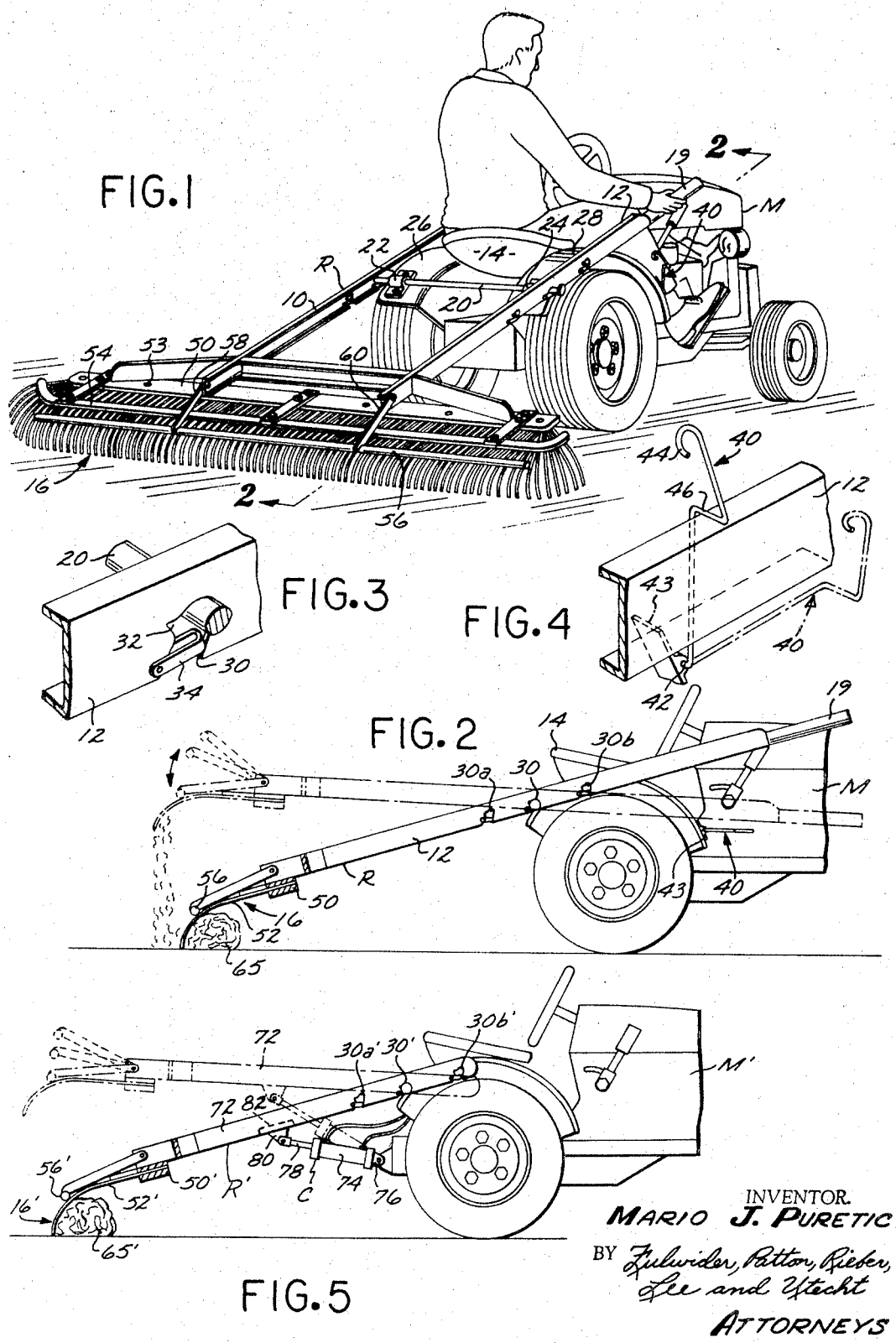

3,438,183
RAKE ATTACHMENT FOR A
GARDEN TRACTOR
Mario J. Puretic, 259 6th Ave. N., Monte Cristo Isle,
Tierra Verde, Fla. 33715
Filed Nov. 25, 1966, Ser. No. 596,913
Int. Cl. A01d 51/00, 77/00
U.S. Cl. 56—27    10 Claims The present invention relates generally to the art of lawn care and more particularly to a unique and novel rake attachment for a garden tractor.

In recent years the garden tractor has come into wide use. Such garden tractor utilizes a seat for an operator and a lawn mowing attachment, this arrangement being termed a "riding mower." Although riding mowers permit a lawn to be cut rapidly and with a minimum expenditure of labor, there still remains the difficult task of removing the cut lawn clippings. It has heretofore been attempted to remove such clippings by means of a brush type sweeper and also by means of a vacuum type sweeper, such sweepers being towed by the garden tractor. Both such sweepers, however, have proven inefficient in operation. Additionally, the vacuum type sweeper is quite expensive. Hence, in the vast majority of cases lawn clippings are removed manually by means of a rake.

It is a major object of the present invention to provide a rake attachment for a garden tractor or riding mower characterized as being highly effective in use and yet adapted for manufacturing at a comparatively low cost.

It is another object of the present invention to provide a rake attachment of the aforedescribed nature which may be readily attached to and detached from a garden tractor.

Yet a further object of the present invention is to provide a rake attachment of the aforedescribed nature which does not seriously interfere with the manueuverability of the garden tractor.

Another object of the present invention is to provide a rake attachment of the aforedescribed nature from which gathered clippings may be easily removed and deposited at a desired location.

A more particular object of the present invention is to provide a rake attachment of the aforedescribed nature that includes a pair of aligned side bars which straddle the seat of the garden tractor, with such side bars being pivotally attached at their intermediate portion to the garden tractor and supporting at their rear ends a rake head. The center of gravity of the side bars and the attached rake head is disposed forwardly of the center of gravity of the side bars and attached rake head, whereby the rake head normally engages the ground and with the rake head being liftable from the ground by the exertion of downward manual force by the tractor operator on the front portion of either of the side bars.

These and other objects and advantages of the present invention will become apparent from the following detailed description, when taken in conjunction with the appended drawings wherein:

FIGURE 1 is a perspective view showing a preferred form of rake attachment embodying the present invention operably attached to a garden tractor;

FIGURE 2 is a side elevational view of said rake attachment;

FIGURE 3 is an enlarged fragmentary perspective showing of the pivotal attachment of said rake attachment to the garden tractor;

FIGURE 4 is an enlarged fragmentary perspective view showing a locking device for holding the rake attachment in a raised position; and FIGURE 5 is a broken side elevational view showing a second form of rake attachment embodying the present invention.

Referring to the drawings, a preferred form of rake attachment R embodying the present invention is shown secured to a conventional garden tractor or riding mower M. The riding mower M includes a lawn mowing attachment (not shown). The rake attachment includes a pair of side bars 10 and 12 of like construction that straddle the seat 14 of the riding mower M. The rear ends of the side bars 10 and 12 are attached to a rake head, generally designated 16. The intermediate portion of the side bars 10 and 12 are pivotally secured to the rear portion of the body of the riding mower M. Forwardly of the center of gravity of the side bars and the attached rake head 16. Accordingly, the rake head 16 will normally engage the ground in a raking position as indicated in solid outline in FIGURE 2. The rake head 16 may be lifted from the ground 18 by the exertion of downward manual force on the front portion of either of the side bars so as to lift the rake head 16 to its elevated position shown in phantom outline in FIGURE 2.

More particularly, the side bars 10 and 12 may be formed of aluminum, wood, or other suitable material affording rigidity at a comparatively low weight. The front ends of the side bars define handles 19. The side bars are pivotally attached to the rear portion of the body of the riding mower by means of a horizontal pivot pin 20 that extends through a pair of like brackets 22 and 24 attached, respectively, to the left and right fenders 26 and 28 of the riding mower M.

As indicated, particularly in FIGURE 3, the side bars 10 and 12 are each formed with a plurality of longitudinally spaced upwardly extending recesses 30, 30a and 30b for selectively removably receiving the outer ends of the pivot bar 20. A locking pocket 32 extends upwardly and rearwardly from each recess 30. A U-shaped locking clip 34 is disposed within the recess 30, the legs thereof being pivotally attached to each respective side bar at the lower rear portion of recess 30. With the locking clip 34 disposed in its solid outline position of FIGURE 3, i.e. below the pivot bar 20, the side bar 12 will be locked against upward movement away from pivot bar 20. When the locking clip 34 is pivoted in a counter-clockwise direction, the side bar may be lifted upwardly relative to the pivot bar 20.

Referring now to FIGURE 4, there is provided a pair of locking clamps, generally designated 40, for temporarily securing the side bars 10 and 12 in their phantom outline position of FIGURE 2, i.e. with the rake head 16 elevated from the ground. Only one of these locking clamps 40 are visible in the drawing. Locking clamp 4 is preferably of integral construction and fabricated from a single length of flexible steel rod material. Clamp 40 includes a lower pivot element 42 that is carried by a mounting bracket 43 secured to the front of the tractor fenders 26 and 28. The upper portion of the latch bar 40 is formed with a finger grip 44 while the intermediate portion thereof is formed with a horizontally extending leg 46 that is engageable with the upper surface of its respective side bar 12 to retain same in its depressed portion shown in phantom outline in FIGURE 2. It should be understood that the laching clamp 40 is normally disposed in its lowered phantom outline position of FIGURE 4 when the rake head 16 is engaged with the ground. When the rake head 16 is to be locked in its raised position shown in phantom outline in FIGURE 2, the side bar handles 19 are depressed and the locking clamp 40 is then pivoted rearwardly to a generally vertically extending position shown in FIGURE 4. In this position leg 46 abuts the upper surface of its respective side bar. The flexible nature of the material from which it is formed permits the latching clamp 40 to flex inwardly and thereby clear its respective side bar.

The rake head 16 includes a rigid two-piece tine support 50 that is rigidly affixed to the rear ends of the side bars 10 and 12. The tine support 50 securely sandwiches together the front ends of a plurality of flexible steel tines 52 by means of bolts 53. Preferably, the tines 52 curve downwardly and rearwardly relative to the support bar 50. An elongated stiffener 54 is mounted rearwardly of the tine support 50 and engages the upper surfaces of the tines 52. A rigid clapper bar 56 extends parallel to the tine stiffener 54. Clapper bar 56 is affixed to the rear ends of a pair of crank arms 58 and 60 having their forward ends pivotally attached to the rear ends of side bars 10 and 12, respectively. The clapper bar 56 normally rests upon the upper surfaces of intermediate portion of the tines 52 at a point disposed rearwardly of the tine stiffener 54.

In the operation of the aforedescribed apparatus, an aligned pair of the recesses 30, 30a or 30b will be engaged with the pivot bar 20. The particular pair of recesses utilized will be dependent upon several variables, such as the size and type of the riding mower M, the angle at which it is desired that the rake tines 52 engage the ground, or the amount of space between the rake head 16 and the riding mower M that appears most suitable. No matter which pair of recesses is engaged, however, the center of gravity of the side bars 10 and 12 and the attached rake head 16 will always be located rearwardly of the recesses receiving the pivot bar 20.

During forward motion of the riding mower M, the rake tines 52 will efficiently gather lawn clippings 65, or the like, and effect their forward movement over the ground. Preferably, the outermost rake tines 52 will be configured forwardly as well as outwardly to more efficiently retain the gathered clippings. The operator can readily vary the amount of downward pressure applied by the rake tines 52 by exerting upward or downward pressure on the handles 19 of side bars 10 and 12. By exerting an upward pressure on one or both handles 19 the rake tines 52 will be caused to dig down harder against the ground. By bearing dowwardly on either side bar handle, the downward pressure exerted by the rake tines 52 can be reduced.

The rake tines 52 may be completely lifted off of the ground when the operator forces the side bar handles 19 downwardly so as to permit the riding mower M to be backed-up or for bypassing certain areas, as for example gravel walkways. In this manner lawn clippings will not be deposited upon such walkway, conversely gravel will not be dragged from the walkway onto a lawn. The lawn clippings may be transported to a desired dumping area by means of the lowered rake head 16. At such dumping area, the operator will grasp one or both of the side bar handles 19 and vertically reciprocate same. In this manner, as indicated in FIGURE 2, the clapper bar 56 will be caused to pivot vertically and strike the rake tines 52 with a succession of firm blows to thereby free the lawn clippings from the rake tines. The locking clamps 40 may then be engaged with the side bars 10 and 12 to maintain the rake head 16 elevated from the ground as the riding mower M is driven away from the dumping area.

Referring now to FIGURE 5, there is shown a second form of rake attachement R' embodying the present invention. Like parts in this form bear primed reference numerals. The rake attachment R' of FIGURE 5 is generally identical with rake attachement R shown in FIGURES 1 through 4 with the exception that a fluid-operated cylinder-plunger unit C is interposed between the rear end of the riding mower M' and the intermediate portion of the side bars. Also, the side bars are terminated a short distance forwardly of the front recesses 30b'.

The cylinder 74 of the unit C is shown pivotally attached to a tongue 76 welded to the rear end of the riding mower M', while the plunger 78 is shown having its rear end pivotally attached to a bracket 80 that depends from a cross-piece 82 which bridges the side bars 70 and 72. The plunger 78 is caused to undergo reciprocation under the influence of pressurized fluid provided by a source (not shown) carried by the riding mower M'. Suitable conventional controls (not shown) will be provided for the mower operator in order that he may effect such reciprocation. In this manner, the side bars 70 and 72 may be pivoted relative to the pivot bar 20' by power rather than manually. It will be apparent that with the plunger 78 extended the rake head 16' will be locked in an elevated position relative to the ground.

Various modifications and changes may be made with respect to the foregoing detailed description, without departing from the spirit of the present invention or the scope of the following claims.

I claim:
1. A rake attachment for a garden tractor having a body upon which is mounted an operator's seat, said attachment comprising:
   a pair of aligned side bars that straddle said tractor seat;
   a pair of brackets securable to said tractor body adjacent said tractor seat;
   a rake head attached to the rear ends of said side bars,
   and pivot means interconnecting said brackets and the intermediate portion of said side bars forwardly of the center of gravity of said side bars and attached rake head whereby said rake head normally engages the ground.

2. A rake attachment as set forth in claim 1 wherein selectively operable locking means are interposed between said tractor body and said side bars to support said side bars in a position wherein said rake head is elevated from the ground.

3. A rake attachment as set forth in claim 1 wherein the rear ends of said side bars pivotally support a pair of crank arms, with the rear of said crank arms carrying a clapper bar engageable with said rake head to free gathered material from said rake head.

4. A rake attachment as set forth in claim 1 wherein the front ends of said side bars define handles that are manually engaged to lift said rake head from the ground.

5. A rake attachment as set forth in claim 1 wherein a fluid-operated cylinder-plunger unit is operatively interposed between said tractor body and said side arms to control the angle of said side bars relative to the ground.

6. A rake attachment as set forth in claim 2 wherein the rear ends of said side bars pivotally support a pair of crank arms, with the rear of said crank arms carrying a clapper bar engageable with said rake head to free gathered material from said rake head.

7. A rake attachment as set forth in claim 2 wherein the front ends of said side bars define handles that are manually engaged to lift said rake head from the ground.

8. A rake attachment as set forth in claim 3 wherein a fluid-operated cylinder-plunger unit is operatively interposed between said tractor body and said side arms to control the angle of said side bars relative to the ground.

9. A rake attachment as set forth in claim 6 wherein the front ends of said side bars define handles that are manually engaged to lift said rake head from the ground.

10. A rake attachment as set forth in claim 7 wherein the rear ends of said side bars pivotally support a pair of crank arms, with the rear of said crank arms carrying a clapper bar engageable with said rake head to free gathered material from said rake head.

References Cited

UNITED STATES PATENTS

| | | | |
|---|---|---|---|
| 2,246,870 | 6/1941 | Turner | 56—27 |
| 2,366,234 | 1/1945 | Blaydes | 56—27 |
| 2,475,908 | 7/1949 | McCleskey | 56—27 |
| 2,648,946 | 8/1953 | Kelly | 56—385 |

RUSSELL R. KINSEY, *Primary Examiner.*